(12) United States Patent
Fan

(10) Patent No.: US 7,002,704 B1
(45) Date of Patent: Feb. 21, 2006

(54) METHOD AND APPARATUS FOR IMPLEMENTING ANTI-COUNTERFEITING MEASURES IN PERSONAL COMPUTER-BASED DIGITAL COLOR PRINTERS

(75) Inventor: Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 908 days.

(21) Appl. No.: 09/707,409

(22) Filed: Nov. 6, 2000

(51) Int. Cl.
*G06F 15/00* (2006.01)

(52) U.S. Cl. .................. 358/1.16; 358/1.14; 358/1.15

(58) Field of Classification Search ............... 358/1.16, 358/1.14; 380/51; 283/902; 399/234, 366
See application file for complete search history.

(56) References Cited

U.S. PATENT DOCUMENTS

| 5,533,144 | A | 7/1996 | Fan |
| 6,067,374 | A | 5/2000 | Fan et al. |
| 6,411,392 | B1 * | 6/2002 | Bender et al. ............. 358/1.14 |
| 6,549,638 | B1 * | 4/2003 | Davis et al. ................ 382/100 |
| 6,687,017 | B1 * | 2/2004 | Kakiuchi et al. .......... 358/1.14 |
| 6,731,784 | B1 * | 5/2004 | Yang .......................... 382/135 |
| 6,766,056 | B1 * | 7/2004 | Huang et al. ............... 382/190 |

FOREIGN PATENT DOCUMENTS

| EP | 0 675 631 A2 | 10/1995 |
| EP | 0 751 663 A2 | 1/1997 |

* cited by examiner

*Primary Examiner*—Twyler M. Lamb
(74) *Attorney, Agent, or Firm*—Fay, Sharpe, Fagan, Minnich & McKee, LLP

(57) ABSTRACT

A system for rendering an electronic image representation associated with a software application program is disclosed. The system includes a PC-based host processor programmed to execute the software application program, a temporary storage device associated with the host processor, and a printer interfaced to the host processor. A printer driver routine is operative on the host processor and determines whether the electronic image representation is of a counterfeit document by examining at least a portion of the electronic image representation when stored in the temporary storage device during the course of printing the electronic image representation at the printer.

20 Claims, 4 Drawing Sheets

METHOD AND APPARATUS FOR IMPLEMENTING ANTI-COUNTERFEITING MEASURES IN PERSONAL COMPUTER-BASED DIGITAL COLOR PRINTERS

BACKGROUND OF THE INVENTION

The present invention relates to the digital color printer art. It finds particular application in conjunction with a method and apparatus for implementing anti-counterfeiting measures in personal computer-based digital color printers, and will be described with particular reference thereto. However, it should be appreciated that the present invention may also find application in conjunction with other types of digital color marking systems and applications where anti-counterfeiting measures are implemented.

It is known to implement anti-counterfeiting measures in high-end electrophotographic marking devices, such as xerographic copiers, which anti-counterfeiting measures typically require relatively large amounts of on-board memory and processing power. Electrophotographic marking is performed by exposing an image representation of a desired document onto a substantially uniformly charged photoreceptor. In response to the image representation, the photoreceptor discharges so as to create an electrostatic latent image of the desired document on the photoreceptor's surface. Toner particles are then deposited onto the latent image so as to form a toner image. The toner image is then transferred from the photoreceptor onto a substrate such as a sheet of paper. The transferred toner image is then fused to the substrate, usually using heat and/or pressure. The surface of the photoreceptor is then cleaned of residual developing material and recharged in preparation for the production of another image. Electrophotographic marking can be used to produce color images by repeating the above process once for each color of toner that is used to make the composite color image.

There has been a proliferation of low-end marking devices, such as digital color printers that are primarily used with personal computers (PCS), and that are now capable of generating very high quality color renderings of image representations at a relatively low cost. This has led to a growing concern over the possibility of using such low-end digital color printers for illicitly reproducing or otherwise generating currency, checks, stock certificates, legal documents, and other printed documents that are not legally reproducible. Obviously, any reproductions of these documents are counterfeit and illegal.

Low-end marking devices typically do not include a large amount of on-board memory or processing capability. Thus, it is not feasible to incorporate the same relatively expensive, hardware intensive, anti-counterfeiting measures found in high-end electrophotographic marking devices into such low-end, PC-based, digital color printers. Accordingly, it is considered desirable to develop a new and improved, low-cost, method and apparatus for implementing anti-counterfeiting measures in PC-based digital color printers, that meets the above-stated needs and overcomes the foregoing difficulties and others while providing better and more advantageous results.

SUMMARY OF THE INVENTION

In accordance with one aspect of the present invention, a system for rendering an electronic image representation associated with a software application program is disclosed. The system includes a host processor programmed to execute the software application program; a temporary storage device associated with the host processor; a printer interfaced to the host processor; and a software program operative on the host processor for determining whether the electronic image representation is of a predetermined document type by examining at least a portion of the electronic image representation when stored in the temporary storage device during the course of printing the electronic image representation at the printer.

In accordance with another aspect of the present invention, a system for detecting an image representation of a predetermined document type is disclosed. The system includes a host processor; a temporary storage device associated with the host processor; a printer interfaced to the host processor; and software means operative on the host processor for a) buffering print data associated with a first portion of the image representation in the temporary storage device; b) examining the buffered print data for a preselected feature of the predetermined document type; c) rendering at least a portion of the buffered print data on the printer when the preselected feature is not found in the buffered print data; and d) not rendering the buffered print data when the preselected feature is found in the buffered print data.

In accordance with yet another aspect of the present invention, a method for detecting a preselected feature of an electronic image representation in a system including a host processor, a temporary storage device associated with the host processor, and a printer interfaced to the host processor, is disclosed. The method includes a) buffering a first segment of the electronic image representation in the temporary storage device; b) examining the first segment of the electronic image representation for the preselected feature; c) rendering at least a portion of the first segment on the printer when the preselected feature is not found in the first segment; and d) not rendering the first segment when the preselected feature is found in the first segment.

One advantage of the present invention is the provision of a system for rendering an electronic image representation associated with a software application program that leverages the relatively large memory capacity and processing power of the host processor.

Another advantage of the present invention is the provision of a system for rendering an electronic image representation associated with a software application program that incorporates or otherwise bundles an anti-counterfeiting detector routine with a printer driver.

Yet another advantage of the present invention is the provision of a system for rendering an electronic image representation associated with a software application program without disadvantageously increasing the on-board memory capacity and/or processing power of an associated digital color printer.

Yet another advantage of the present invention is the provision of a system for detecting an image representation of a predetermined document type that leverages the relatively large memory capacity and processing power of the host processor.

Still another advantage of the present invention is the provision of a system for detecting an image representation of a predetermined document type that incorporates or otherwise bundles an anti-counterfeiting detector routine with a printer driver.

A still further advantage of the present invention is the provision of a system for detecting an image representation of a predetermined document type without disadvantageously increasing the on-board memory capacity and/or processing power of an associated digital color printer.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
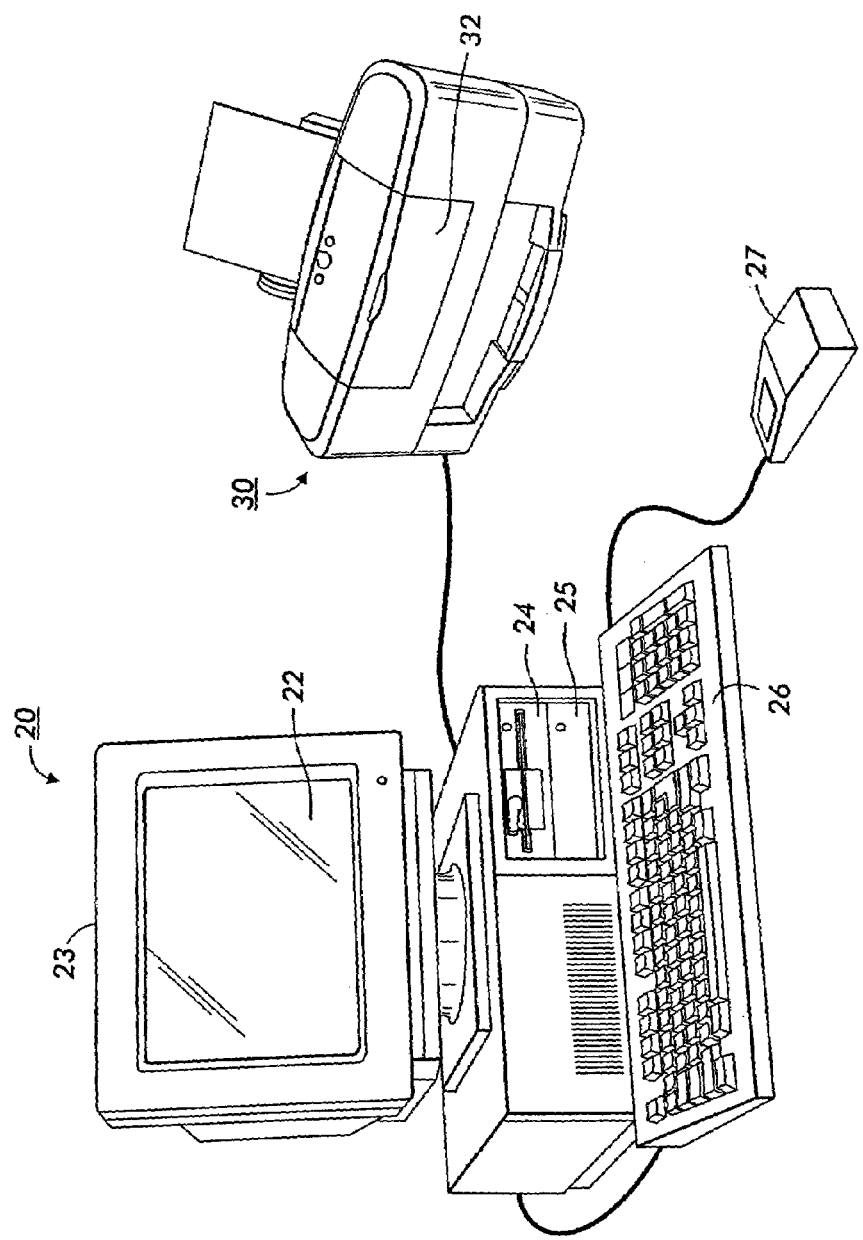
FIG. 1 shows a perspective view of exemplary computing equipment including a personal computer (PC) and an digital color printer that are used in connection with the present invention.

Referring now to FIG. 1, exemplary computing equipment 20 capable of implementing the present invention includes host processor 23 comprising a personal computer (hereinafter "PC"), preferably an IBM PC-compatible computer having a windowing environment, such as Microsoft-.RTM. Windows98. Provided with computing equipment 20 are display screen 22 comprising a color monitor or the like, keyboard 26 for entering text data and user commands, and pointing device 27. Pointing device 27 preferably comprises a mouse for pointing and for manipulating objects displayed on display screen 22.

Computing equipment 20 includes a computer-readable memory medium, such as fixed computer disk 25, and floppy disk interface 24. Floppy disk interface 24 provides a means whereby computing equipment 20 can access information, such as data, application programs, etc., stored on floppy disks. A similar CD-ROM interface (not shown) may be provided with computing equipment 20, through which computing equipment 20 can access information stored on CD-ROMs. Disk 25 stores, among other things, application programs by which host processor 23 generates files, manipulates and stores those files on disk 25, presents data in those files to an operator via display screen 22, and prints data in those files via printer 30. Disk 25 also stores an operating system which, as noted above, is preferably a windowing operating system such as Windows98.

Device drivers are also stored in disk 25. At least one of the device drivers comprises a printer driver which provides a software interface to firmware in printer 30. Data exchange between host processor 23 and printer 30 is described in more detail below.

In a preferred embodiment of the invention, printer 30 is a multi-head serial printer, such as an ink jet printer. Accordingly, although the invention described herein is not limited to use with such a printer, the invention will be described in the context of a such a printer.

Figure 2:
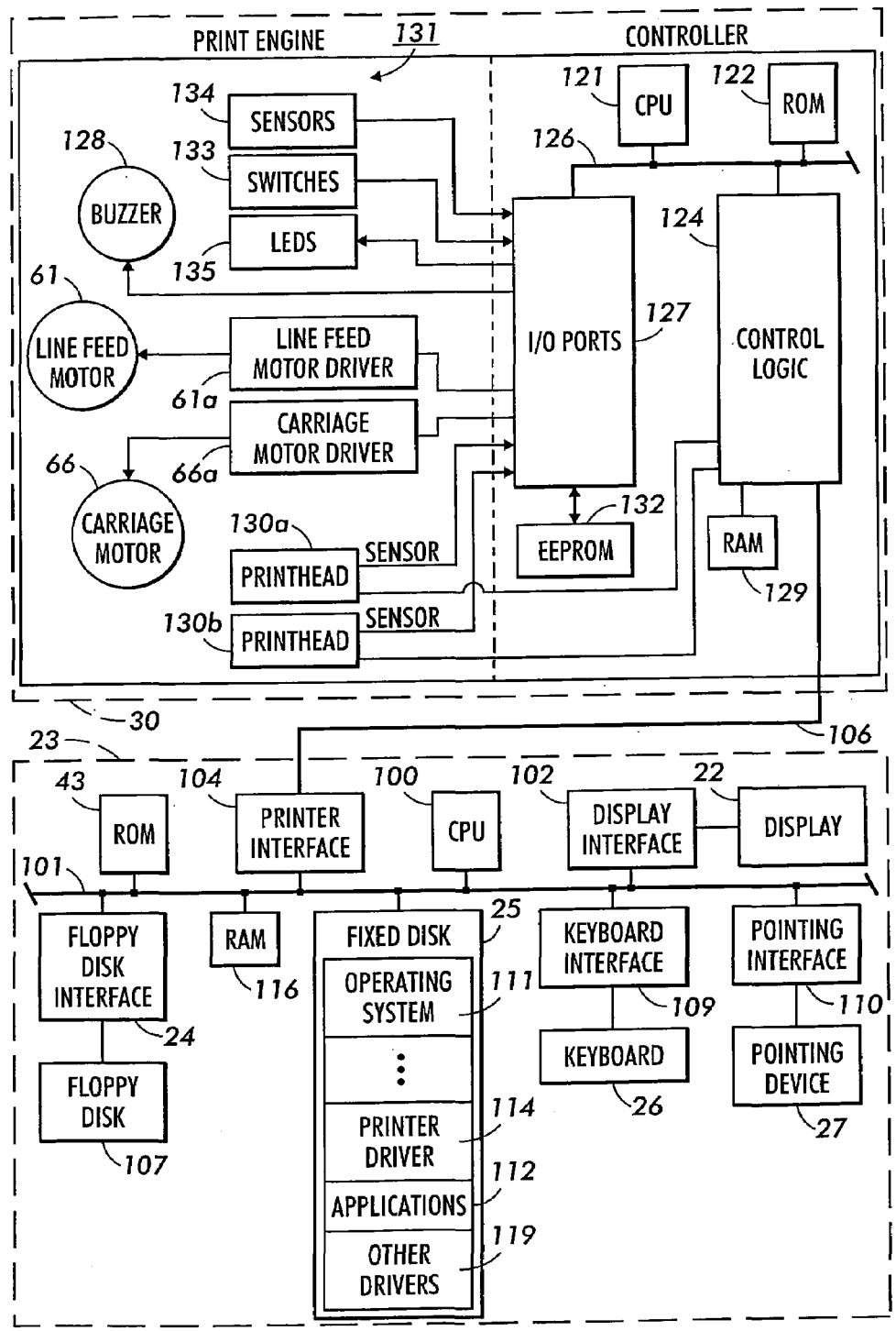
FIG. 2 is a block diagram showing a hardware configuration of a host processor interfaced to the printer of FIG. 1.

FIG. 2 is a block diagram showing the internal structures of host processor 23 and printer 30. In FIG. 2, host processor 23 includes a central processing unit 100 such as a programmable microprocessor interfaced to computer bus 101. Also coupled to computer bus 101 are display interface 102 for interfacing to display 22, printer interface 104 for interfacing to printer 30 through bi-directional communication line 106, floppy disk interface 24 for interfacing to floppy disk 107, keyboard interface 109 for interfacing to keyboard 26, and pointing device interface 110 for interfacing to pointing device 27. Disk 25 includes an operating system section for storing operating system 111, an applications section for storing applications 112, and a printer driver section for storing printer driver 114.

A random access main memory (hereinafter "RAM") 116 interfaces to computer bus 101 to provide CPU 100 with access to memory storage. In particular, when executing stored application program instruction sequences such as those associated with application programs stored in applications section 112 of disk 25, CPU 100 loads those application instruction sequences from disk 25 (or other storage media such as media accessed via a network or floppy disk drive 24) into random access memory (hereinafter "RAM") 116 and executes those stored program instruction sequences out of RAM 116. RAM 116 provides for a print data buffer used by printer driver 114 according to the invention, as described more fully hereinbelow. It should also be recognized that standard disk-swapping techniques available under the windowing operating system allow segments of memory, including the aforementioned print data buffer, to be swapped on and off of disk 25. Read only memory (hereinafter "ROM") 43 in host processor 23 stores invariant instruction sequences, such as start-up instruction sequences or basic input/output operating system (BIOS) sequences for operation of keyboard 26.

As shown in FIG. 2, and as previously mentioned, disk 25 stores program instruction sequences for a windowing operating system and for various application programs such as graphics application programs, drawing application programs, desktop publishing application programs, and the like. In addition, disk 25 also stores color image files such as might be displayed by display 22 or printed by printer 30 under control of a designated application program. Disk 25 also stores a color monitor driver in other drivers section 119 which controls how multi-level RGB color primary values are provided to display interface 102. Printer driver 114 controls printer 30 for both black and color printing and supplies print data for print out according to the configuration of printer 30. Print data is transferred to printer 30, and control signals are exchanged between host processor 23 and printer 30, through printer interface 104 connected to line 106 under control of printer driver 114. Other device drivers are also stored on disk 25, for providing appropriate signals to various devices, such as network devices, facsimile devices, and the like, connected to host processor 23.

Ordinarily, application programs and drivers stored on disk 25 need first to be installed by the user onto disk 25 from other computer-readable media on which those programs and drivers are initially stored. For example, it is customary for a user to purchase a floppy disk, or other computer-readable media such as CD-ROM, on which a copy of a printer driver is stored. Such a floppy disk or CD-ROM is also customarily included with the purchase of printer 30. The user would then install the printer driver onto disk 25 through well-known techniques by which the printer driver is copied onto disk 25. At the same time, it is also possible for the user, via a modem interface (not shown) or via a network (not shown), to download a printer driver, such as by downloading from a file server or from a computerized bulletin board.

With continued reference to FIG. 2, printer 30 includes CPU 121 such as an 8-bit or a 16-bit microprocessor including programmable timer and interrupt controller, ROM 122, control logic 124, and I/O ports unit 127 connected to bus 126. Also connected to control logic 124 is RAM 129. Control logic 124 includes controllers for line feed motor 61, for print image buffer storage in RAM 129, for heat pulse generation, and for head data. Control logic 124 also provides control signals for nozzles in print heads 130a and 130b of print engine 131, carriage motor 66, line feed motor 61, and print data for print heads 130a and 130b, and receives information from print engine 131 for alignment of print heads 130a and 130b through I/O ports unit 127. EEPROM 132 is connected to I/O ports unit 127 to provide non-volatile memory for printer information such as print head configuration and print head alignment parameters. EEPROM 132 also stores parameters that identify the printer, the driver, the print heads, alignment of the print heads, the status of ink in the cartridges, etc., which are sent to printer driver 114 of host processor 23 to inform host processor 23 of the operational parameters of printer 30.

I/O ports unit 127 is coupled to print engine 131 in which the pair of print heads 130a and 130b perform recording on a recording medium by scanning across the recording medium while printing using print data from a print buffer in RAM 129. Control logic 124 is also coupled to printer interface 104 of host processor 23 via communication line 106 for exchange of control signals and to receive print data and print data addresses. ROM 122 stores font data, program instruction sequences used to control printer 30, and other invariant data for printer operation. RAM 129 stores print data in a print buffer defined by printer driver 114 for print heads 130a and 130b and other information for printer operation.

Print heads 130a and 130b of print engine 131 correspond to ink cartridges that are stored in cartridge receptacles (not shown). Sensors generally indicated as 134 are arranged in print engine 131 to detect printer status and to measure temperature and other quantities that affect printing. For instance, a photo sensor in cartridge receptacles measures print density and dot locations for automatic alignment. Sensors 134 are also arranged in print engine 131 to detect other conditions such as the open or closed status of access cover 32 (FIG. 1), presence of recording media, etc. In addition, diode sensors, including a thermistor, are located in print heads 130a and 130b to measure print head temperature, which is transmitted to I/O ports unit 127.

I/O ports unit 127 also receives input from switches 133 such as a power button and a resume button and delivers control signals to indicator LEDs 135, to buzzer 128, and to line feed motor 61 and carriage motor 66 through line feed motor driver 61a and carriage motor driver 66a, respectively. The buzzer 128 may comprise a speaker.

Although FIG. 2 shows individual components of printer 30 as separate and distinct from one another, it is preferable that some of the components be combined. For example, control logic 124 may be combined with I/O ports 127 in an ASIC to simplify interconnections for the functions of printer 30.

Figure 3:
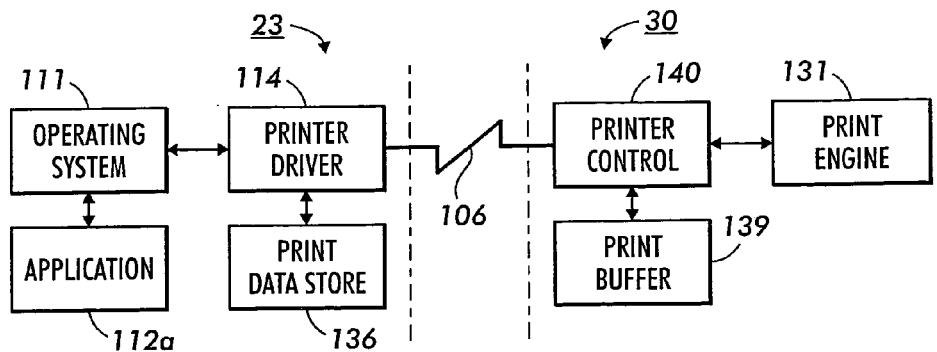
FIG. 3 shows a functional block diagram of the host processor and printer of FIG. 1.

FIG. 3 shows a high-level functional block diagram that illustrates the interaction between host processor 23 and printer 30. As illustrated in FIG. 3, when a print instruction is issued from image processing application program 112a stored in application section 112 of disk 25, operating system 111 issues graphics device interface (GDI) calls to printer driver 114. The printer driver 114 is a software program that enables a software application such as image processing application program 112a to access the features of printer 30. For example, when an image is printed, the application program 112a sets up a print job with formatting commands such as page breaks, font selections, paper tray selections, number of copies, etc. The printer driver 114 takes these commands, translates them into a printer language such as Printer Control Language (PCL) or PostScript and then sends the print job to the printer 30.

Thus, the printer driver 114 responds to GDI calls issued from the operating system 111 by generating PCL print data corresponding to the print instructions, and stores the PCL print data in print data store 136. That is, the application program 112a and/or operating system 111 converts the desired print data into GDI or other text commands and graphics primitives with associated page positions and/or forms controls. These commands may be formatted by the printer driver 114 into a recognizable industry defined data definition (e.g. PCL), or the printer driver 114 may use the application program 112a and/or platform intermediate commands (e.g., Microsoft Windows™. GDI primitives) and act on these commands to create internal direct printer commands to control the printer 30. Where necessary, the printer driver 114 may also perform additional image processing operations on the PCL data such as color correction, halftoning, etc. before the print job is sent to the printer 30.

Print data store 136 may reside in RAM 116 or in disk 25, or through disk swapping operations of operating system 111 may initially be stored in RAM 116 and swapped in and out of disk 25. Thereafter, printer driver 114 obtains print data from print data store 136 and transmits the print data through printer interface 104, to bidirectional communication line 106, and to print buffer 139 through printer control 140. Print buffer 139 resides in RAM 129 and printer control 140 resides in control logic 124 and CPU 121 of FIG. 2. Printer control 140 processes the print data in print buffer 139 responsive to commands received from host processor 23 and performs printing tasks under control of instructions stored in ROM 122 to provide appropriate print head and other control signals to print engine 131 for recording images onto recording media.

Print buffer 139 has a first section for storing print data to be printed by one of print heads 130a and 130b, and a second section for storing print data to be printed by the other one of print heads 130a and 130b. Each print buffer section has storage locations corresponding to the number of print positions of the associated print head. These storage locations are defined by printer driver 114 according to a resolution selected for printing. Each print buffer section also includes additional storage locations for transfer of print data during ramp-up of print heads 130a and 130b to printing speed. Print data is transferred from print data store 136 in host processor 23 to storage locations of print buffer 139 that are addressed by printer driver 114. As a result, print data for a next scan may be inserted into vacant storage locations in print buffer 139 both during ramp up and during printing of a current scan.

One benefit of having a PC-side printer driver system is the movement of the print job processing into the PC itself, rather than at the printer 30, thereby permitting more flexibility and control. Another benefit of this system is that more advanced functions are possible by using a more powerful host PC, while permitting cost minimization of the printer hardware itself (e.g. less memory and processing capability).

Figure 4:
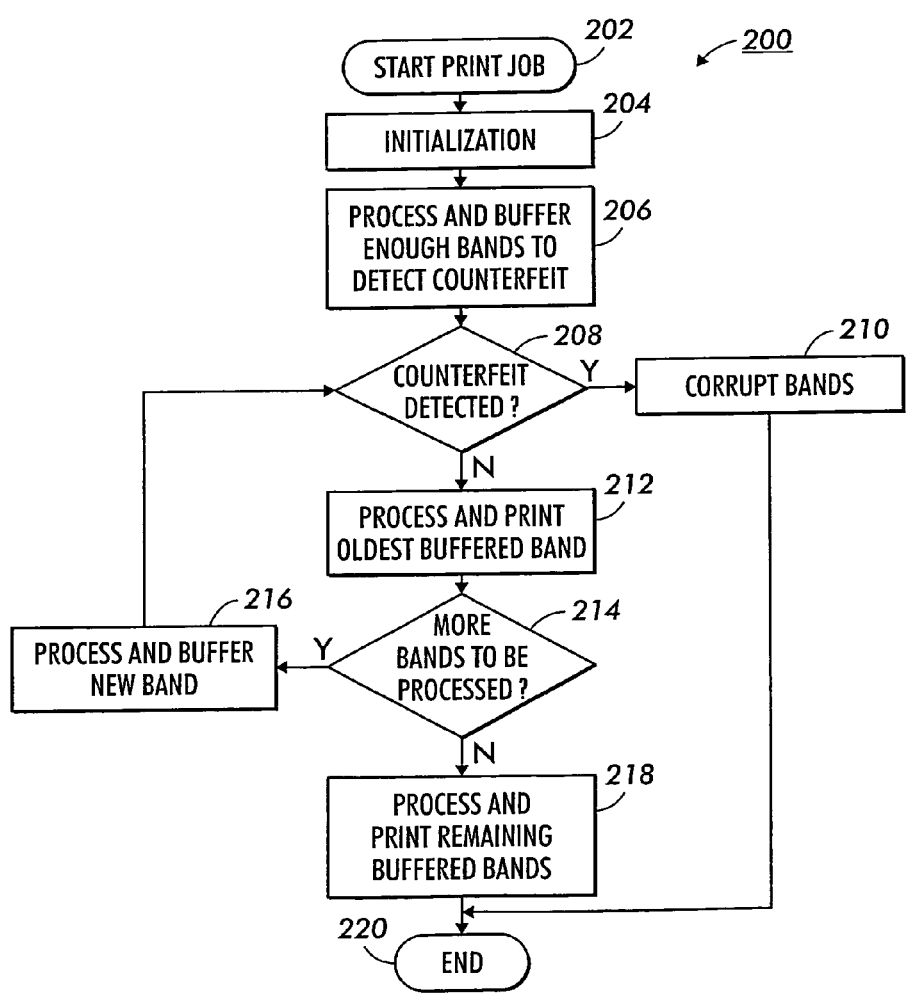
FIG. 4 is a flow chart illustrating a method for implementing anti-counterfeiting measures in the computing equipment of FIG. 1.

With reference now to FIG. 4, one such advanced function that executes as part of or in association with printer driver 114 within the PC 23, rather than the printer 30, is an anti-counterfeiting detector routine 200 (FIG. 5) that i) intercepts PCL data formatted by the printer driver 114, ii) stores the intercepted PCL data in a buffer such as a vacant area of the print data store 136, iii) examines the buffered PCL data and recognizes one or more preselected image features such as patterns, security marks, icons, seals, etc. that may be represented in the buffered PCL data, and iv) and corrupts, obliterates, or otherwise ruins the PCL data when such an image feature (indicative of a counterfeit document) is detected.

When images are printed band-by-band (i.e. swath-by-swath), it may be necessary to buffer multiple bands of print data in a temporary memory area such as within the print data store 136. The actual amount of print data that must be buffered depends on the image context size required to detect the preselected feature(s) (i.e. pattern, security mark, icon, seal, etc.) within a counterfeit image representation. That is, if the size of the preselected feature is greater than the size (i.e. the number of rows) of a single band of print data, then multiple bands of print data must be buffered before the print data can be examined for such a feature. As defined herein, a band or swath of print data refers or otherwise corresponds to the number of rows of data that can be printed by the printheads 130a, 130b collectively (either aligned or offset along the media feed or x-axis) during a single traverse of a print carriage along the carriage scan or y-axis (perpendicular to the media feed or x-axis) across the print media.

Figure 5:
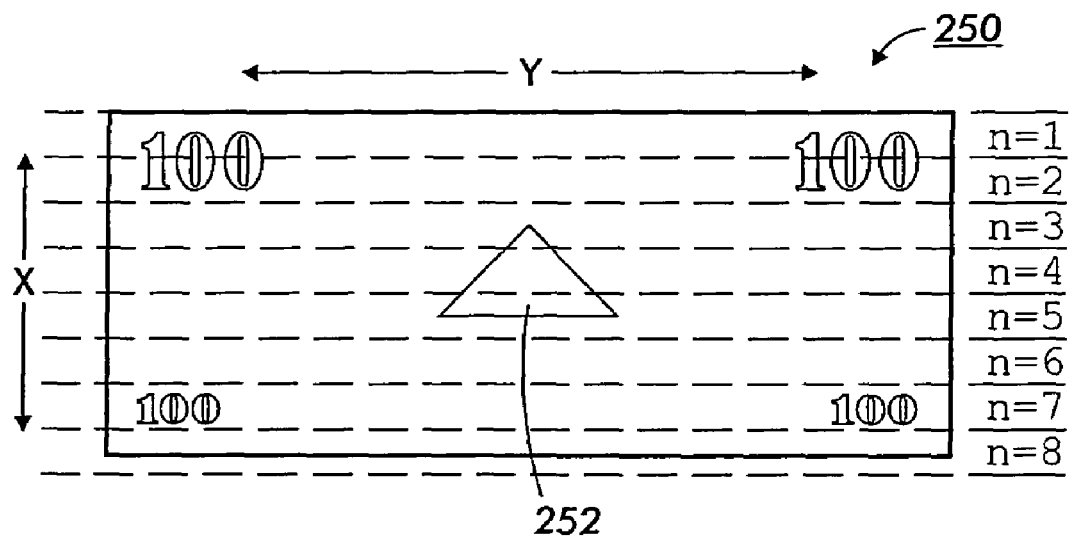
FIG. 5 is an exemplary image representation capable of being printed by the printer of FIG. 1.

With continued reference to FIG. 4, and particular reference to FIG. 5, an exemplary electronic image representation 250 of a paper currency is shown to include a conventional feature 252 such as a pattern, security mark, icon, seal, etc. The particular electronic image representation 250 can be entirely recorded (i.e. printed) with eight passes of the printheads 130a, 130b across the print media along the carriage scan or y-axis. Accordingly, the print data generated by the application 112a is divided into eight bands (n) each of which corresponds to a respective swath of the printheads 130a, 130b. The anti-counterfeiting detector routine 200 processes the bands of print data according to the following pseudo-code, where N is number of bands or swaths required to print the image representation, M is the number of bands of print data needed to detect a counterfeit image, and n is the current band of print data:

1. Print Command Start
2. Counterfeit_Detected=FALSE
3. Bands_Buffered=0
4. n=1
5. For band n=1 to N, do 6–16
  6. Translate GDI calls to PCL data
  7. Image processing I for band n
  8. Buffer band n
  9. Bands_Buffered=Bands_Buffered+1
  10. If Bands_Buffered >=M, do 11–16
    11. Counterfeit_Detected=Currency_Detectiono
    12. If Counterfeit_Detected=True, do 13–14
      13. corrupt data
      14. goto 20
    15. Image processing II for band n–M+1 data
    16. Send band n–M+1 data to printer
17. For band n=N–M+2 to N, do 18–19
  18. Image processing II for band n data
  19. Send band n data to printer
20. End The anti-counterfeiting detector routine 200 (FIG. 4) starts when a print job is initiated, such as when printing the electronic image representation 250 (step 202). Following an initialization step 204 (lines 2–4 of pseudo-code), a first band of print data (n=1) is processed and buffered (step 206). That is, the band of print data is first translated from GDI calls to PCL data (line 6 of pseudo-code), and then one or more image processing operations may be performed on the first band of PCL data (line 7 of pseudo-code). For instance, if necessary, a conventional color correction operation can be performed on the first band of PCL data prior to buffering the first band of PCL data in the print data store 136 (line 8 of pseudo-code). It should be noted that certain image processing operations (e.g. halftoning) may correct the PCL data to the point that the printer driver's ability to detect a counterfeit image representation is adversely effected, and should not be performed in step 206.

It is then determined whether there are enough bands of print data buffered in the print data store 136 to detect the preselected feature 252 (line 10 of pseudo-code). In the case of the paper currency image representation 250 (FIG. 5), three bands of PCL data (M=3) must be buffered in the print data store 136 in order to detect the feature 252. If the necessary number (M=3) of PCL data bands are not buffered, then control returns to pseudo-code line 5 and the next band of print data (n=2) is processed and buffered (lines 6–9 of pseudo-code).

Once the necessary number (M=3) of PCL bands are processed and buffered, control advances to step 208 where one or more counterfeit detection subroutines are executed. Generally, each counterfeit detection subroutine is designed to detect one or more preselected features such as patterns, security marks, icons, seals, etc. that are embedded in the image data. Thus, a counterfeit detection subroutine that is specifically designed to detect the image feature 252 would be employed in step 208.

However, it is contemplated that any known counterfeit detection scheme can be implemented in step 208 (line 11 of pseudo-code). Suitable methods for detecting specific features in image representations of counterfeit documents are disclosed in issued U.S. Pat. Nos. 5,533,144 and 6,067,374, and in copending U.S. patent application Ser. No. 09/328, 481, filed on Jun. 9, 1999, and assigned to the same assignee of the present invention, all three of which are hereby incorporated by reference for all that they disclose.

If the preselected feature 252 is detected in the currently buffered PCL data, then control advances to step 210 where one or more steps are taken to prevent the complete image representation from being printed at the printer 30. More particularly, the bands of PCL data not yet printed can be corrupted or obliterated in some manner such as by writing over the PCL data with a uniform pixel value or a pattern of pixel values, terminating the printing process, erasing the PCL data, generating an error message, etc.

If the preselected feature 252 is not detected in the currently buffered PCL data, then control advances to step 212 where further processing of the oldest band (n=1) of currently buffered PCL data occurs (i.e. further image processing and printing occurs on a first-in-first-out (FIFO) basis) (line 15 of pseudo-code). That is, one or more additional image processing operations can be performed on the oldest band of currently buffered PCL data, prior to sending or otherwise making the oldest band of currently buffered PCL data available to the printer 30 for printing (line 16 of pseudo-code). For instance, if necessary, a conventional half-toning operation can be performed on the oldest band of currently buffered PCL data prior to being printed.

As indicated above, it should be appreciated that certain image processing operations (e.g. such as half-toning) may affect the ability of the counterfeit detection subroutine (step 208) to detect a counterfeit image, while other image processing operations (e.g. color correction) may have no such effect. Accordingly, those image processing operations that do not affect the ability of the counterfeit detection scheme to detect a preselected feature (i.e. pattern, security mark, icon, seal, etc.) can be performed prior to (e.g. step 206) executing the counterfeit detection subroutine (step 208), while those image processing operations that do affect the ability of the counterfeit detection scheme to detect the feature can be performed after (e.g. step 212) the counterfeit detection subroutine has returned a FALSE value.

Once the oldest band of currently buffered PCL data is printed, control advances to step 214 to determine if there are additional bands of print data to be processed (e.g. bands 4–8). If so, control advances to step 216 (line 5 of pseudo-code) where the next band of print data (e.g. n=4) processed and buffered (lines 6–9 of pseudo-code). Thereafter, steps 208–216 are executed to band-wise process and buffer each of the N bands of print data comprising the image representation.

After i) the Nth (e.g. N=8) band of print data has been processed and buffered (lines 6–9 of pseudo-code), ii) the counterfeit detection subroutine has not detected the preselected feature 252 in the currently buffered PCL data (line 11 of pseudo-code), and iii) the (N−M+1)th and oldest band of currently buffered PCL data (e.g. 8−3+1=6th) is printed, then control advances to step 218 where the remaining bands of buffered print data (e.g. the 7th and 8th bands) are processed and then printed (lines 17–19 of pseudo-code). Thereafter, the routine 200 ends at step 220.

Thus, the relatively large memory capacity and processing power of the host processor 23 can be leveraged to provide a cost-effective anti-counterfeiting solution for PC-based, digital color printers (e.g. 30) by incorporating (i.e. embedding within) or otherwise bundling an anti-counterfeiting detector routine (e.g. 200) with a printer driver (e.g. 114) without disadvantageously increasing the on-board memory capacity and/or processing power of the digital color printer 30.

The invention has been described with reference to the preferred embodiment(s). Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A system for rendering an electronic image representation associated with a software application program, the system comprising:

a host processor programmed to execute the software application program;

a temporary storage device associated with the host processor;

a printer interfaced to the host processor; and software means operative on the host processor for determining whether the electronic image representation is of a predetermined document type by examining at least a portion of the electronic image representation that is stored in the temporary storage device during the course of printing the electronic image representation at the printer, said portion of the electronic image representation being in a printer control language format when examined.

2. The system of claim 1, wherein the host processor is a personal computer.

3. The system of claim 1, wherein the temporary storage device is a plurality of memory addresses allocated in a random access memory of the host processor.

4. The system of claim 1, wherein the software means is a printer driver software program.

5. The system of claim 1, wherein the predetermined document type is a counterfeit document type.

6. The system of claim 1, wherein the electronic image representation is stored and printed on a band-by-band basis.

7. The system of claim 1, wherein the printer is an ink jet-type printer.

8. A system for detecting an image representation of a predetermined document type, the system comprising:

a host processor;

a temporary storage device associated with the host processor;

a printer interfaced to the host processor; and software means operative on the host processor for:

a) buffering print data associated with a first portion of the image representation in the temporary storage device;

b) examining the buffered print data for a preselected feature of the predetermined document type;

c) rendering at least a portion of the buffered print data on the printer when the preselected feature is not found in the buffered print data; and d) not rendering the buffered print data when the preselected feature is found in the buffered print data.

9. The system of claim 8, wherein the host processor is a personal computer.

10. The system of claim 8, wherein the temporary storage device is a plurality of memory addresses allocated in a random access memory of the host processor.

11. The system of claim 8, wherein the software means is a printer driver software program.

12. The system of claim 8, wherein the predetermined document type is a counterfeit document type.

13. The system of claim 8, wherein the electronic image representation is buffered and rendered on a band-by-band basis.

14. The system of claim 8, wherein the printer is an ink jet-type printer.

15. A method for detecting a preselected feature of an electronic image representation in a system including a host processor, a temporary storage device associated with the host processor, and a printer interfaced to the host processor, the method comprising:

a) buffering a first segment of the electronic image representation in the temporary storage device;

b) examining the first segment of the electronic image representation for the preselected feature;

c) rendering at least a portion of the first segment on the printer when the preselected feature is not found in the first segment; and d) not rendering the first segment when the preselected feature is found in the first segment.

16. The method of claim 15, wherein a) includes buffering at least one band of the electronic image representation.

17. The method of claim 15, further including:
e) prior to b), performing an image processing operation on the first segment.

18. The method of claim 15, further including:
e) prior to c), performing an image processing operation on the portion of the first segment.

19. The method of claim 15, further including:
e) prior to b), performing an image processing operation on the first segment; and
f) prior to c), performing an image processing operation on the portion of the first segment.

20. The method of claim 15, further including:
e) repeating steps a)–d) for additional segments of the electronic image representation.

\* \* \* \* \*